United States Patent
Cesa et al.

(10) Patent No.: US 6,238,574 B1
(45) Date of Patent: May 29, 2001

(54) OXIDATION AND AMMOXIDATION OF ACRYLONITRILE PROCESS WASTE WATER ORGANICS

(75) Inventors: Mark Clark Cesa, South Euclid; Anne Marie Graham, Township of Northfield Center; Albert Richard Shuki, Township of Sagamore Hills, all of OH (US)

(73) Assignee: The Standard Oil Company, Chicago, IL (US)

( * ) Notice: Subject to any disclaimer, the term of this patent is extended or adjusted under 35 U.S.C. 154(b) by 0 days.

(21) Appl. No.: 09/182,774

(22) Filed: Oct. 30, 1998

(51) Int. Cl.[7] ........................................ C02F 1/72
(52) U.S. Cl. .................. 210/763; 210/909; 423/376; 558/320; 558/324
(58) Field of Search .................... 210/762, 763, 210/908; 423/376; 558/303, 308, 311, 313, 315, 319, 320, 323, 324

(56) References Cited

U.S. PATENT DOCUMENTS

| | | | | |
|---|---|---|---|---|
| 3,516,789 | * | 6/1970 | Sennewald et al. | 23/151 |
| 4,376,107 | * | 3/1983 | Morgenthaler | 423/531 |
| 4,699,720 | * | 10/1987 | Harada et al. | 210/762 |
| 5,183,577 | * | 2/1993 | Lehmann | 210/761 |
| 5,192,453 | * | 3/1993 | Keckler et al. | 210/761 |
| 5,204,079 | * | 4/1993 | Suresh et al. | 423/376 |
| 5,288,473 | * | 2/1994 | Shaw et al. | 423/237 |
| 5,306,418 | * | 4/1994 | Dou et al. | 208/157 |
| 5,457,223 | * | 10/1995 | Shaw et al. | 558/319 |
| 5,635,076 | * | 6/1997 | Bremer et al. | 210/750 |
| 6,013,825 | * | 1/2000 | Someya et al. | 558/324 |

* cited by examiner

Primary Examiner—Peter A. Hruskoci
(74) Attorney, Agent, or Firm—David P. Yusko

(57) ABSTRACT

A process for upgrading aqueous acrylonitrile waste streams containing organic material comprising atomizing an acrylonitrile waste water stream containing organic material, introducing the atomized acrylonitrile waste water stream at a temperature below the decomposition temperature of the organics present in the waste water stream, into a reaction zone containing a catalyst and at least one reactant gas, reacting the atomized waste water stream and reactant gas in the presence of the catalyst to convert at least some of the organics in the waste water stream into at least one compound selected from the group consisting of acetonitrile, hydrogen cyanide and acrylonitrile.

10 Claims, No Drawings

OXIDATION AND AMMOXIDATION OF ACRYLONITRILE PROCESS WASTE WATER ORGANICS

BACKGROUND OF THE INVENTION

The present invention is directed to a process for catalytic upgrading of the organic compounds present in the waste streams generated during the manufacture of acrylonitrile. This upgrading is carried out by catalytic oxidation or ammoxidation of the aqueous liquid waste stream containing the organic compounds.

Typical technologies for treatment and/or disposal of waste organics from the propylene ammoxidation process for manufacture of acrylonitrile include deep welling, biotreatment, and/or incineration. In addition, there are also numerous patents describing catalytic technologies for destruction of organics in waste water streams. There are many references to vapor phase processes. Non-catalytic "wet oxidation" technologies have also been reported, including U.S. Pat. No. 5,192,453 assigned to the assignee of the instant application. These methods are characterized by destruction of organics to $CO_2$, water and inorganic nitrogen compounds; in these technologies no attempt is made to recover organics.

Hydrogen cyanide is currently manufactured by direct ammoxidation of methane (the Andrussow process) and as a byproduct of ammoxidation of propylene in the acrylonitrile process. Hydrogen cyanide can also be produced by oxidation or ammoxidation of acetonitrile, as described in Japanese Patent 59/227718 (CA 102: 168669y); Japanese Patent 59/203726 (CA 102: 133968t); Japanese Patent 49/33039 (CA 82: 61264d); West German Patent 1,146,861 (CA 59: 241b); Japanese Patent 54/71100 (CA 91: 177416v); Japanese Patent 54/71800 (CA 91: 142725t); H. Seeboth and R. Mitschke, Chem. Tech. (Leipzig), 1971, 23, 746–748; Japanese Patent 61/111913 (CA 106: 35511b); A. Ozaki, Y. Shiratsuchi, K. Mori, Kogyo Kagaku Zasshi, 1965, 68, 283–286 (CA 63: 14105e). References to HCN manufacture by cofeeding HCN with propylene in a conventional ammoxidation process include Belgian Patent 623,100 and U.S. Pat. No. 3,516,789. In U.S. Pat. No. 5,204,079 a method is described for manufacture of HCN by ammoxidation of crude acetonitrile, a co-product stream produced in the acrylonitrile manufacturing process. This crude acetonitrile stream contains some but not all of the components of acrylonitrile process waste water. In particular, crude acetonitrile as defined in the above patent does not contain the high molecular weight compounds found in relatively large amounts in acrylonitrile process waste water, and acrylonitrile and acetonitrile were not produced. HCN can also be prepared by ammoxidation or ammoniation of coal in aqueous slurry form; see G. E. Johnson, W. A. Decker, A. J. Forney, and J. H. Field, Hydrogen Cyanide from the Reaction of Coal with Ammonia, United States Department of the Interior, Bureau of Mines, Report of Investigations 6994. The composition of the organics in coal slurry is substantially different from that of the heavy organics in acrylonitrile process waste water.

While numerous methods for preparation of acetonitrile, acrylonitrile, and HCN have been reported, applicants do not know of any specific procedure for dealing with manufacture of either acrylonitrile, HCN, or acetonitrile by ammoxidation of waste water streams or mixtures of organics and water as set forth in the instant application.

Atomization of a liquid stream has been used for reducing a liquid into small droplets for ease of vaporization and reaction. An example is a fuel oil heating system. With atomization of fuel oil in a fuel oil burner, the actual combustion reaction takes place in the vapor phase at a more rapid rate than if the fuel oil were not atomized. Atomizing burners typically use a mechanical force to atomize, such as a rotary cup (Centrifugal force), auxiliary fluid (steam pressure force), and mechanical (fluid pressure). The latter two types use a nozzle design to force the fluids through small holes or slots for high velocity and turbulence which breaks the liquid into droplets. A tube carrying a high velocity gas is also well known to function as an atomizer when a liquid is injected into the flowing gas. The high velocity gas shears the liquid into droplets.

SUMMARY OF THE INVENTION

It is the primary object of the present invention to provide a process for the upgrading of acrylonitrile process waste water into useful products such as acrylonitrile, hydrogen cyanide and acetonitrile.

It is a further object of the present invention to provide a process for upgrading acrylonitrile process waste water into useful products resulting in the substantially complete conversion of any heavy organics in the waste water into harmless byproducts (e.g. $CO_2$).

The advantages of the process of the present invention include the following:

1. The use of acrylonitrile process waste water as a feedstock results not only in the production of HCN but unexpectedly in the production of acrylonitrile and acetonitrile as well, with the concomitant conversion of the organics present in the starting waste water and, in particular, the essentially complete conversion of the heavy organics.

2. When the process of this invention is carried out, as expected, as part of an acrylonitrile production process, the product mixture can be readily combined with propylene ammoxidation reactor effluent for recovery and purification of the products, saving substantially on manufacturing costs.

3. When the process of this invention is carried out in conjunction with an ammonia reduction process as described in U.S. Pat. No. 5,288,473, assigned to the assignee of the present application, the waste water is particularly suited to the catalytic reaction converting the organics to HCN, acetonitrile, and acrylonitrile, especially as a vapor-phase catalytic process.

4. It is well known that acrylonitrile process waste water can polymerize to a coke-like solid substance when heated above its boiling point. It has been unexpectedly found that this material can be fed in the vapor phase to a fluid bed catalytic reactor, in a particularly preferred mode of the invention, without polymerization or carbonization of the feed lines or vaporizer. This is accomplished with a tubular atomization feed system one type of which is described below.

5. When the process of this invention is carried out, as expected, as part of an acrylonitrile production process, the process waste water feed does not need to be stripped of volatile organics. The residual products including acrylonitrile, HCN and acetonitrile are fully recovered. This saves the cost of the waste water stripper in the plant.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the process of the present invention comprises atomizing an acrylonitrile waste water stream containing organic material, introducing the atomized acrylonitrile waste water stream at a temperature below the decomposition temperature of the organics present in the waste water stream, into a reaction zone containing a catalyst and at least one reactant gas, reacting the atomized waste water stream and reactant gas in the presence of the catalyst to convert at least some of the organics in the waste water stream into at least one compound selected from the group consisting of acetonitrile, hydrogen cyanide and acrylonitrile.

In a preferred embodiment of the present invention, the atomization is performed by injecting the waste water stream into a high velocity gas stream (i.e. tubular atomization). In the present invention, a tubular atomization system not only provides small droplets for more rapid reaction but also minimizes the residence time of waste water in the feed line. The droplets are rapidly conveyed into the hot reaction zone by the atomizing gas.

In a further preferred embodiment of the present invention, the reaction zone is either a fixed bed or fluid bed reactor, most preferably, a fluid bed reactor.

In another preferred embodiment of the present invention, the atomized waste water is kept at a temperature below 150° C. prior to entry into the reaction zone, preferably between 50° C. to 100° C.

In still another preferred embodiment of the present invention, the waste stream is atomized with an inert gas, air, ammonia or, preferably, steam.

Reference will now be made in detail to the practice of the process of the present invention.

DETAILED DESCRIPTION OF THE INVENTION

Materials

Acrylonitrile process waste water is an aqueous stream containing unrecovered acrylonitrile, HCN, and acetonitrile, and byproducts such as acrolein, acrylic acid, acrylamide, pyridine, methanol, butenenitriles, pyrazine, pyrimidine, acetic acid, nicotinonitrile, fumaronitrile, maleonitrile, pyrazole, succinonitrile, various cyanohydrins, other low molecular weight organic compounds, and organic compounds of relatively high molecular weight but indeterminate structure. The amount of these low molecular weight organic compounds typically totals 0.2 to 5 weight percent, and the amount of high molecular weight materials can range from less than 1 percent by weight up to 10 weight percent or more. The composition of acrylonitrile waste water is described in K. Deutsch, D. Schimke, B. Neugebauer, K. H. Bielecki, and J. Stocker, *J. Prakt. Chem.*, 1979, 321(1), 137–140. Acrylonitrile waste water produced by current acrylonitrile technology can also contain inorganic salts, primarily diammonium sulfate, $(NH_4)_2SO_4$, in amounts up to 10 weight percent or more. The relative proportions of the components of acrylonitrile process waste water can vary over a substantial range, depending on plant operating conditions. However, concentrations of the various components are typically found to be in the ranges described above, with water substantially comprising the difference.

The source of waste water in acrylonitrile plants varies from plant to plant but most often comes from the bottom of a stripper column prior to disposal operations. In some cases this waste water is disposed of directly, whereas in other cases it is further processed before disposal. For example, the waste water could be blended into other waste water streams for dilution or concentrated through evaporation of water to recover ammonia.

A vapor phase flow reaction system is preferred, with either fixed bed or fluid bed catalyst. In this mode the careful introduction of the waste water to the reaction zone is carried out with a tubular atomization feed system. The waste water is kept at a temperature well below the decomposition temperature of the waste water organic mixture and is operated in such a way that the feed liquid is atomized into droplets and rapidly conveyed into the hot catalyst bed. The waste water may be gas atomized with any inert gas, air, ammonia, or, preferably, steam. This system essentially prevents polymerization of the feed and fouling of the feed system and the reactor, and is designed to deliver the feed directly to the catalyst bed. The waste water is kept at temperatures below 150° C. and preferably between 50° C. and 100° C.

In the vapor phase reaction mode it is sometimes necessary to reactivate the catalyst by oxidizing off carbonaceous deposits. These deposits form on the catalyst surface because the waste water is rich in carbon relative to hydrogen and there may be insufficient residence time to convert all the waste water organics. This regeneration can be accomplished by any of several methods. Reactor feeds can be replaced with air, and temperatures can be adjusted as necessary to remove the deposits by controlled catalytic combustion. The catalyst can be removed to a separate reactor for combustive removal. The catalyst can be moved continuously from the reactor unit to the regeneration unit and then back to the reactor unit in a process design analogous to those used in fluid catalytic cracking. In a particularly preferred mode, where the ammoxidation or oxidation reaction is carried out in a fluid bed catalytic mode, the reactor can be configured with two beds: a relatively hot lower bed where catalyst regeneration is carried out, and a relatively cool upper bed where oxidation or ammoxidation takes place. This mode has the advantage of minimizing reactor costs and reactor offgas volume which must be processed for recovery of products.

Reaction temperatures are within the range of 300° C. to 550° C. Pressures are within the range of about 0.1 to 10 atmospheres absolute. In the vapor phase reaction mode, the mixture of acrylonitrile process waste water, ammonia, and oxygen or air is allowed to remain in contact with the catalyst for between about 0.05 second to 50 seconds, preferably about 1 to 20 seconds.

The molar ratios of the reaction components can vary within wide limits. For example, 0.01 to 10 moles ammonia and 5 to 60 mol air may be used per mole of organic carbon in the waste water feed. For the oxidation reaction, the preferred mole ratio range of air is 6 to 35 moles per mole of organic carbon. For the ammoxidation reaction, the preferred mole ratio ranges of air and ammonia are 6 to 35 moles and 0.5 to 5 moles per mole of organic carbon respectively.

The practice of the process of the present invention is not dependent upon any specific ammoxidation fluid bed catalyst. For example, typical promoted $FeBiMoO_x$ catalyst, promoted $FeSbO_x$ catalyst or promoted $USbO_x$ catalyst may be utilized in the practice of the present invention. Typical of the types of catalyst which may be utilized in the practice of the present invention may be found in U.S. Pat. Nos. 3,642,930; 4,435,079; 3,911,089; 4,873,215; 5,134,105; 5,093,299; Japanese Patent Application 74-87474 and 78-35232.

In a preferred embodiment of the invention, the acrylonitrile process waste water reacts to form HCN, acetonitrile, and acrylonitrile in a separate reactor system, and the reactor effluent is fed either directly to the propylene ammoxidation quench contactor or is fed to a separate quench contactor and the effluent is then fed to the propylene ammoxidation absorber column. In this manner the propylene ammoxidation recovery and purification system can be used to recover and purify the incremental HCN, acetonitrile, and acrylonitrile produced by the oxidation or ammoxidation of the waste water. In another preferred embodiment, the reaction can be carried out in the main propylene ammoxidation reactor in situ by feeding the waste water directly to the main catalyst bed, thus further simplifying the process.

The following examples are set forth below only for illustrative purposes.

EXAMPLE 1

A 32.22 g sample of acrylonitrile process waste water collected as the bottoms from a reactor effluent acid neutralization (quench) column, of composition by weight 72.7% water and 8.06% total organic carbon comprising HCN 2.254%, acetone 0.0011%, acrolein 0.0033%, methanol 0.024%, acrylonitrile 0.285%, acetonitrile 0.058%, pyridine 0.0032%, acetic acid 0.113%, acrylic acid 0.291%, fumaronitrile 0.041%, nicotinonitrile 0.021%, pyrazole 0.149%, and acrylamide 0.192%, with the remainder primarily comprised of high molecular weight organics, was separated into light and heavy fractions by trap-to-trap distillation on a vacuum line at 0.1 mm Hg to yield a light fraction of 31.67 g of distillate and a heavy fraction of 5.01 g. The analysis of the heavy fraction, a dark brown oil, showed acrolein 0.0197% by weight, acrylonitrile 0.0326%, pyridine 0.145%, acetic acid 0.274%, acrylic acid 0.622%, fumaronitrile 0.0277%, nicotinonitrile 0.0768%, pyrazole 1.734%, acrylamide 1.294%, succinonitrile 2.42%, and bis(2-cyanoethyl)ether 0.194%, essentially no HCN, and the remainder comprising heavy organics. Elemental analysis of the oil showed 26.14% nitrogen, 45.22% carbon, and 6.80% hydrogen. 0.61 g of this heavy organic fraction was dissolved in 35 mL of distilled water and stirred at room temperature with a 20.41 g sample of a promoted FeBeMoO$_x$ ammoxidation catalyst. The mixture was then evaporated to dryness on a rotary evaporator, keeping the temperature of the mixture at or below 80° C. Further drying was accomplished by subjecting the resultant solid to vacuum (0.1 mm Hg) at room temperature. The product solid catalyst contained 0.67 weight percent nitrogen and 0.96 weight percent carbon.

4.6023 g of the impregnated catalyst were placed in a 5 mL volume upward flow stainless steel microreactor (8 mm i.d.). The reactor was immersed in a salt bath at 480° C., and a gas mixture of 2.33 mL/min. O$_2$, 14.98 mL/min. N$_2$, and 1.77 mL/min. NH$_3$ (measured at room temperature) was passed over the catalyst. The effluent gas was analyzed continuously by gas chromatography after it was passed through an ice-cold scrubber solution of 1.0 N aqueous HCl. Reactant gases were passed over the catalyst for 3.5 hours, until analysis of the effluent gas showed essentially no CO$_2$. Analysis of the effluent gas showed 51.4% yield of CO$_2$ based on the carbon on the catalyst and 86.7% conversion of the O$_2$ fed. Titration of the scrubber solution with base showed 88.1% conversion of the NH$_3$ fed. The total organic carbon (TOC) of the scrubber solution was 1234 ppm. HCN yield (by titration) was 4.9%, acrylonitrile yield was 1.24%, acetonitrile yield was 1.68%, and acrylic acid yield was 0.53%. Conversion of acrolein was 100%, pyridine 71.4%, fumaronitrile 74.3%, pyrazole 31.2%, acrylamide 100%, succinonitrile 78.5%, and bis(2-cyanoethyl)ether 100%. Analysis of the catalyst after the reaction showed less than 0.15% nitrogen and less than 0.25% carbon (below detection limits.)

EXAMPLE 2

4.7 g of the impregnated catalyst used in Example 1 were placed in a 5 mL volume upward flow stainless steel microreactor (8 mm i.d.). The reactor was immersed in a salt bath at 460° C., and a gas mixture of 2.33 mL/min. O$_2$, 14.98 mL/min. N$_2$, and 1.77 mL/min. NH$_3$ (measured at room temperature) was passed over the catalyst. The effluent gas was analyzed continuously by gas chromatography after it was passed through an ice-cold scrubber solution of 1.0 N aqueous HCl. Reactant gases were passed over the catalyst for 4 hours, until analysis of the effluent gas showed essentially no CO$_2$. Analysis of the effluent gas showed 68.3% yield of CO$_2$ based on the carbon on the catalyst and 81.3% conversion of the O$_2$ fed. Titration of the scrubber solution with base showed 85.4% conversion of the NH$_3$ fed. The total organic carbon (TOC) of the scrubber solution was 1365 ppm. HCN yield (by titration) was 5.3%, acrylonitrile yield was 0.93%, acetonitrile yield was 1.28%, and acrylic acid yield was 0.35%. Conversion of acrolein was 100%, pyridine 100%, fumaronitrile 72.2%, pyrazole 61.2%, acrylamide 100%, succinonitrile 79.5%, and bis(2-cyanoethyl)ether 100%. Analysis of the catalyst after the reaction showed less than 0.15% nitrogen and less than 0.25% carbon (below detection limits).

EXAMPLE 3

3.0624 g of the impregnated catalyst used in Example 1 were placed in a 5 mL volume upward flow stainless steel microreactor (8 mm i.d.). The reactor was immersed in a salt bath at 430° C., and a gas mixture of 2.33 mL/min. O$_2$, 14.98 mL/min. N$_2$, and 1.77 mL/min. NH$_3$ (measured at room temperature) was passed over the catalyst. Water was co-fed to the reactor by syringe at a rate of 0.25 g/hr. The effluent gas was analyzed continuously by gas chromatography after it was passed through an ice-cold scrubber solution of 1.0 N aqueous HCl. Reactant gases were passed over the catalyst for 2.33 hours, until analysis of the effluent gas showed essentially no CO$_2$. Analysis of the effluent gas showed 47.3% yield of CO$_2$ based on the carbon on the catalyst and 45.2% conversion of the O$_2$ fed. Titration of the scrubber solution with base showed 4.6% conversion of the NH$_3$ fed. The total organic carbon (TOC) of the scrubber solution was 1177 ppm. HCN yield (by titration) was 8.2%, acrylonitrile yield was 1.50%, and acetonitrile yield was 1.39%. Conversion of acrolein was 100%, pyridine 28.1%, acrylic acid 47.4%, fumaronitrile 100%, pyrazole 31.2%, acrylamide 100%, succinonitrile 62.4%, and bis(2-cyanoethyl)ether 100%. Analysis of the catalyst after the reaction showed less than 0.15% nitrogen and less than 0.25% carbon (below detection limits).

EXAMPLE 4

4.5429 g of the impregnated catalyst used in Example 1 were placed in a 5 mL volume upward flow stainless steel microreactor (8 mm i.d.). The reactor was immersed in a salt bath at 480° C., and a gas mixture of 2.57 mL/min. O$_2$ and 16.51 mL/min. N$_2$ (measured at room temperature) was passed over the catalyst. The effluent gas was analyzed continuously by gas chromatography after it was passed through an ice-cold scrubber solution of 1.0 N aqueous HCl.

Reactant gases were passed over the catalyst for 2.25 hours, until analysis of the effluent gas showed essentially no $CO_2$. Analysis of the effluent gas showed 81.3% yield of $CO_2$ and 4.2% yield of CO based on the carbon on the catalyst and 100% conversion of the $O_2$ fed. HCN yield (by titration) was 4.2%, and total yield of organics measurable by gas chromatography was 12.3%. Analysis of the catalyst after the reaction showed less than 0.15% nitrogen and less than 0.25% carbon (below detection limits).

EXAMPLE 5

A 64.55 g sample of acrylonitrile process waste water collected as the bottoms from a reactor effluent acid neutralization (quench) column, of composition by weight 72.7% water and 8.06% total organic carbon comprising HCN 2.254%, acetone 0.0011%, acrolein 0.0033%, methanol 0.024%, acrylonitrile 0.285%, acetonitrile 0.058%, pyridine 0.0032%, acetic acid 0.113%, acrylic acid 0.291%, fumaronitrile 0.041%, nicotinonitrile 0.021%, pyrazole 0.149%, and acrylamide 0.192%, with the remainder primarily comprised of high molecular weight organics, was separated into light and heavy fractions by trap-to-trap distillation on a vacuum line at 0.1 mm Hg to yield a light fraction of 54.51 g of distillate and a heavy fraction of 10.04 g. The analysis of the heavy fraction, a dark brown oil, showed acrolein 0.0187% by weight, acrylonitrile 0.0721%, pyridine 0.0938%, acetic acid 0.0736%, acrylic acid 0.495%, fumaronitrile 0.005%, nicotinonitrile 0.107%, pyrazole 1.693%, acrylamide 0.920%, and succinonitrile 2.12%, essentially no HCN, and the remainder comprising heavy organics. 0.73 g of the heavy organic fraction described in Example 1 was dissolved in 40 mL of distilled water and stirred at room temperature with a 25.01 g sample of an equilibrated fluid bed catalytic cracking catalyst. The mixture was then evaporated to dryness on a rotary evaporator, keeping the temperature of the mixture at or below 80° C. Further drying was accomplished by subjecting the resultant solid to vacuum (0.1 mm Hg) at room temperature.

3.8158 g of the impregnated catalyst of Example 1 were placed in a 5 mL volume upward flow stainless steel microreactor (8 mm i.d.). The reactor was immersed in a salt bath at 460° C., and a gas mixture of 2.33 mL/min. $O_2$, 14.98 mL/min. $N_2$, and 1.77 mL/min. $NH_3$ (measured at room temperature) was passed over the catalyst. Water was co-fed to the reactor by syringe at a rate of 0.25 g/hr. The effluent gas was analyzed continuously by gas chromatography after it was passed through an ice-cold scrubber solution of 1.0 N aqueous HCl. Reactant gases were passed over the catalyst for 4.35 hours, until analysis of the effluent gas showed essentially no $CO_2$. Analysis of the effluent gas showed 31.3% yield of $CO_2$ and 6.7% yield of CO based on the carbon on the catalyst and 43.0% conversion of the $O_2$ fed. Titration of the scrubber solution with base showed 7.7% conversion of the $NH_3$ fed. HCN yield (by titration) was 7.4%, acrylonitrile yield was 0.36%, and acetonitrile yield was 1.73%. Conversion of acrolein was 100%, acetic acid 74.8%, acrylic acid 32.1%, fumaronitrile 100%, pyrazole 65.4%, acrylamide 81.6%, and succinonitrile 18.0%. Analysis of the catalyst after the reaction showed less than 0.15% nitrogen and less than 0.25% carbon (below detection limits).

Comparative Example 1

A 5 mL volume upward flow stainless steel microreactor (8 mm i.d.) was charged with 1.8451 g of a promoted $FeBiMoO_x$ catalyst composition similar but not the same as the catalyst utilized in Example 1. The reactor was heated to 450° C. over 30 minutes in a molten salt bath with a flow of helium through the catalyst bed. After this time the unconcentrated acrylonitrile process waste water described in Example 1 was fed to the reactor at a flow rate of 0.309 g/hr. by syringe along with a gas comprised of 1.37 mL/min. $O_2$ and 5.80 mL/min. $N_2$. The contact time was 4.59 seconds. Reactants were fed for 70 minutes, and the reactor effluent was passed through a scrubber containing 0.050 N aqueous NaOH. Analysis of the reactor effluent gas showed 5.3% yield of CO and 5.2% yield of $CO_2$. Analysis of the scrubber solution showed an apparent conversion of HCN of 1.5%. The liquid feed syringe showed substantial fouling at the tip, which had been immersed below the level of the molten salt bath during the experiment. The carbon balance was low. Essentially similar results were obtained in experiments where the reactor was filled with inert material instead of catalyst, demonstrating that the contents of the reactor effluent were the result of substantial decomposition of the feed liquid when fed in the way described.

Comparative Example 2

A 5 mL volume upward flow stainless steel microreactor (8 mm i.d.) was charged with 1.9848 g of the catalyst used in Comparative Example 1 and the reactor was heated to 450° C. over 30 minutes in a molten salt bath with a flow of helium through the catalyst bed. After this time the unconcentrated acrylonitrile process waste water described in Example 1 was fed to the reactor at a flow rate of 0.332 g/hr. by syringe along with a gas comprised of 1.38 mL/min. $O_2$, 2.62 mL/min. $N_2$, and 1.03 mL/min. $NH_3$. The contact time was 5.24 seconds. Reactants were fed for 60 minutes, and the reactor effluent was passed through a scrubber containing 0.50 N aqueous HCL. Analysis of the reactor effluent gas showed 5.8% yield of CO and 26.8% yield Of $CO_2$. Analysis of the scrubber solution showed an apparent conversion of HCN of 5.6%. The liquid feed syringe showed substantial fouling at the tip, which had been immersed below the level of the molten salt bath during the experiment. The carbon balance was low. Essentially similar results were obtained in experiments where the reactor was filled with inert material instead of catalyst, demonstrating that the contents of the reactor effluent were the result of substantial decomposition of the feed liquid when fed in the way described.

EXAMPLES 6–18

For the following examples, a 1½ inch diameter×3 feet height reactor was used in the fluid bed mode. The reactor was fed air through a bottom grid for fluidization. The inside contained spaced sieve trays for breaking bubbles and improving mixing. The static catalyst bed height was 1.5 feet. The catalyst and reactor effluent were separated using a porous metal filter. Heat was supplied to the walls with a wound Nichrome heater, and pressure was controlled with a control valve on the exit gases. The temperature inside the reactor was measured and controlled with thermocouples inside a centered thermowell. Waste water was fed into the side of the reactor just above the air grid and flush with the inside wall using the following atomization tube assembly. Air was fed through a 1/16 inch outside diameter tube at high velocity, and waste water was fed into this gas stream for atomization. The tubing was surrounded by a ½ inch pipe heat exchanger for cooling with cold water and the assembly screwed into the wall of the reactor. The air to the bottom reactor grid plus the air for atomization was the total air supplied to the reactor. Ammonia when used was premixed with air and fed to the bottom grid of the reactor.

The composition of the waste water was analyzed for components using gas chromatography and for carbon using UIC Coulometrics Total Carbon Analyzer. The waste water composition is as described in Example 1. A recovery run lasting about 45 minutes was completed to measure performance. During a recovery run, reactor effluent gas was scrubbed to remove and measure ammonia and condensable organics such as hydrogen cyanide, acrylonitrile, acetic acid and acrylic acid. Ammonia was titrated and the organics measured using a liquid gas chromatograph. After scrubbing, the reactor effluent gas stream was collected in a sample cylinder for analysis of components such as nitrogen, oxygen, carbon dioxide and carbon monoxide by gas chromatography. Yield of products was computed on the basis of the carbon in the cumulative feed. Yield of hydrogen cyanide (HCN), acrylonitrile (AN), and acetonitrile (ACN) are reported on a "gross" and "net" basis, the latter after deducting the amounts in the waste water feed. A "free" HCN value of 1.02% was used in the net calculation instead of "total" HCN of 2.2%. The amounts of residual organics in the waste water feed are indicative of waste water before stripping, that is, before the removal of volatile organics by passage of steam or inert gas through the mixture.

EXAMPLE 6

A waste water feed containing organics, air and ammonia at a mole ratio of 20:1.8:1 air:ammonia:carbon in the waste water was fed over a promoted $BiMoFeO_x$ ammoxidation catalyst in a reactor, a recovery run was completed at 444° C. and 12 psig with a catalyst contact time of 6.3 seconds. Gross yields were 17.4% HCN, 3.5% AN, 2.3% acrylic acid, 0.8% ACN, 1.35% acetic acid, 23.1% CO2 and 4.2% CO. The balance of carbon, 47.35%, was assumed deposited on the catalyst as verified by Example 8 set forth below. Net yields were 1.3% AN, 11.6% HCN and 0.4% ACN.

The gross versus net yields demonstrate another advantage of this invention: the waste water feed can be unstripped thus saving the cost of this operation in the plant.

EXAMPLE 7

At a 21:1 mole ratio of air to carbon in the waste water feed, with 1.8:1 ammonia feed and with the same catalyst used in Example 6 in the reactor, a recovery run was completed at a higher temperature of 495° C. and 12 psig with a catalyst contact time of 6.05 seconds. Gross yields were 21.2% HCN, 3.3% AN, 0.9% acrylic acid, 0.9% ACN, 1.1% acetic acid, 45.3% $CO_2$ and 5.6% CO. The balance of carbon, 47.35%, was assumed deposited on the catalyst as verified by Example 8. Net yields were 1.2% AN, 15.4% HCN and 0.1% ACN.

EXAMPLE 8

At a 25:1 mole ratio of air to carbon in the waste water feed, with 1.8:1 ammonia feed and with the same catalyst used in Example 6 in the reactor, a recovery run was completed at a still higher temperature of 537° C. and 12 psig with a catalyst contact time of 5.8 seconds. Gross yields were 8.3% HCN, 2.5% AN, 2.1% acrylic acid, 0.45% ACN, 1.4% acetic acid, 84.1% $CO_2$ and 7.8% CO. The carbon balance was 106.7%. Net yields were 0.3% AN, 2.4% HCN and 0.05% ACN. This test showed that all the carbon could be accounted for if the temperature is high enough, and suggested that at lower temperatures a portion of the organics in the waste water are deposited on the catalyst. This was verified by carbon analysis of the catalyst which showed an increase from 0.16% to 0.55% after 3 hours on stream.

EXAMPLE 9

At a 21:1 mole ratio of air to carbon in the waste water feed, with no ammonia feed and with the same catalyst used in Example 6 in the reactor, a recovery run was completed at 509° C. and 12 psig with a catalyst contact time of 6.3 seconds. Gross yields were 10.3% HCN, 2.5% AN, 0.8% acrylic acid, 0.3% ACN, 1.2% acetic acid, 44.3% $CO_2$ and 6.3% CO. The balance of carbon, 34.3%, was deposited on the catalyst. Net yields were 0.3% AN, 4.5% HCN and 0% ACN. This example showed that catalytic oxidation of the waste water, that is, without ammonia, is a viable mode of operation.

EXAMPLE 10

The catalyst utilized in this example was a Fluid Catalytic Cracking catalyst (FCC). The FCC catalyst was obtained from a refinery FCC unit and considered "spent" or "used." It is a silica alumina combined with about 15% Y type acid zeolite.

At a 21:1 mole ratio of air to carbon in the waste water feed, with 1.4:1 ammonia feed and with the spent FCC catalyst in the reactor, a recovery run was completed at 482° C. and 12 psig with a catalyst contact time of 5.2 seconds. Gross yields were 3.8% HCN, 1.0% AN, 1.9% acrylic acid, 0.7% ACN, 1.6% acetic acid, 22.2% $CO_2$ and 34.7% CO. The balance of carbon, 34.1%, was deposited on the catalyst. Net yields were −1.1% AN, −2.0% HCN and 0.3% ACN, the negative yields suggesting that these components were consumed in the reactor.

EXAMPLE 11

At a 22:1 mole ratio of air to carbon in the waste water feed, with no ammonia feed and with a promoted vanadium antimony catalyst in the reactor, a recovery run was completed at 450° C. and 12 psig with a catalyst contact time of 4.7 seconds. Gross yields were 11.4% HCN, 0.7% AN, 0.2% acrylic acid, 0.4% ACN, 0.4% acetic acid, 26.4% $CO_2$ and 32.5% CO. The balance of carbon, 28%, was deposited on the catalyst. Net yields were 0.3% AN, 5.6% HCN and 0% ACN.

EXAMPLE 12

At a 33:1 mole ratio of air to carbon in the waste water feed, with 1.5:1 ammonia feed with a promoted $BiFeMoO_x$ catalyst in the reactor, a recovery run was completed at 448° C. and 12 psig with a catalyst contact time of 6.5 seconds. Gross yields were 13.7% HCN, 3.6% AN, 1.2% acrylic acid, 1.1% ACN, 1.4% acetic acid, 25.3% $CO_2$ and 5.1% CO. The balance of carbon, 48.6%, was deposited on the catalyst. Net yields were 1.5% AN, 7.9% HCN and 0.7% ACN.

EXAMPLE 13

At a lower 12:1 mole ratio of air to carbon in the waste water feed, with no ammonia feed and with the same catalyst as in Example 12 in the reactor, a recovery run was completed at 451° C. and 12 psig with a catalyst contact time of 8.0 seconds. Gross yields were 14.6% HCN, 2.3% AN, 0.6% acrylic acid, 0.6% ACN, 1.0% acetic acid, 19.4% $CO_2$ and 9.1% CO. The balance of carbon, 52.4%, was deposited on the catalyst. Net yields were 0.1% AN, 8.8% HCN and 0.3% ACN. Lower air to carbon ratio is advantageous in minimizing the volume of reactor effluent which must be quenched and recovered of products downstream.

EXAMPLE 14

The silica catalyst was prepared by spray drying a silica sol, adjusted in particle size for fluid bed operation, and calcined to 137 m²/g surface area.

At a 15:1 mole ratio of air to carbon in the waste water feed, with 1.5:1 ammonia feed and with the silica catalyst in the reactor, a recovery run was completed at 444° C. and 12.5 psig with a catalyst contact time of 7.2 seconds. Gross yields were 12.7% HCN, 3.8% AN, 0% acrylic acid, 1.6% ACN, 0.9% acetic acid, 16.3% $CO_2$ and 1.0% CO. The balance of carbon, 63.7%, was deposited on the catalyst. Net yields were 1.6% AN, 6.9% HCN and 1.2% ACN.

EXAMPLE 15

A vanadyl pyrophosphate catalyst is suitable for fluid bed operation and useful in the production of maleic anhydride from butane.

At a 15:1 mole ratio of air to carbon in the waste water feed, with 1.4:1 ammonia feed and with the vanadyl pyrophosphate catalyst in the reactor, a recovery run was completed at 450° C. and 12 psig with a catalyst contact time of 6.9 seconds. Gross yields were 1.7% HCN, 0.3% AN, 0.1% acrylic acid, 0.15% ACN, 0.8% acetic acid, 18.0% $CO_2$ and 15.9% CO. The balance of carbon, 63.05%, was deposited on the catalyst. Net yields were −1.8% AN, 4.1% HCN and −0.2% ACN, the negative yields suggesting that these components were consumed in the reactor.

EXAMPLE 16

A waste water of the same source but different in composition from that in Example 1 was used in this and the following examples. The waste water was stripped of volatile organics and had a composition 75.8% water and 11.6% total organic carbon comprising HCN 1.5%, AN 0.078%, ACN 0.0002%, acetic acid 0.01%, acrylic acid 0.057%, methanol negligible, fumaronitrile 0.0003%, nicotinonitrile negligible, pyrazole 0.035%, acrylamide 0.042%, succinonitrile, 0.087%, with the rest primarily high molecular weight organics.

At a 12:1 mole ratio of air to carbon in the waste water feed, with 0.5:1 ammonia feed and with the catalyst of Example 6 in the reactor, a recovery run was completed at 450° C. and 12 psig with a catalyst contact time of 6.8 seconds. Gross yields were 10.3% HCN, 4.2% AN, 0.75% acrylic acid, 1.2% ACN, 0.65% acetic acid, 29.1% $CO_2$ and 5.5% CO. The balance of carbon, 48.3%, was deposited on the catalyst. Net yields were 3.7% AN, 9.7% HCN and 1.2% ACN.

Compared to Example 6 which used the same catalyst and same temperature, the net yield of product shifted to more AN and ACN and less HCN.

EXAMPLE 17

At a 15:1 mole ratio of air to carbon in the waste water feed, with no ammonia feed and with a BiFeMoO$_x$ promoted catalyst useful for ammoxidation of propylene to acrylonitrile in the reactor, a recovery run was completed at 450° C. and 12 psig with a catalyst contact time of 7.8 seconds. Gross yields were 7.0% HCN, 2.2% AN, 0% acrylic acid, 0.5% ACN, 0.8% acetic acid, 34.6% $CO_2$ and 10.4% CO. The balance of carbon, 44.5%, was deposited on the catalyst. Net yields were 1.8% AN, 6.4% HCN and 0.5% ACN.

EXAMPLE 18

At a 15:1 mole ratio of air to carbon in the waste water feed, with no ammonia feed and with a BiFeMoO$_x$ promoted catalyst in the reactor, a recovery run was completed at 450° C. and 12 psig with a catalyst contact time of 6.9 seconds. Gross yields were 19.0% HCN, 3.6% AN, 0.5% acrylic acid, 0.5% ACN, 0.8% acetic acid, 35.0% $CO_2$ and 7.9% CO. The balance of carbon, 32.7%, was deposited on the catalyst. Net yields were 3.2% AN, 18.4% HCN and 0.5% ACN. The unusually high yield of HCN was verifiable but declined to 9% after several hours on stream.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What we claim as our invention is:

1. A process for upgrading aqueous acrylonitrile waste streams containing organic material comprising atomizing an acrylonitrile waste water stream containing organic material, introducing the atomized acrylonitrile waste water stream at a temperature below the decomposition temperature of the organics present in the waste water stream, into a reaction zone containing a catalyst and at least one reactant gas, reacting the atomized waste water stream and reactant gas in the presence of the catalyst to convert at least some of the organics in the waste water stream into carbon dioxide and at least one compound selected from the group consisting of acetonitrile, hydrogen cyanide and acrylonitrile at a reaction temperature above the boiling point of said waste water stream, without polymerizing said organic material.

2. The process of claim 1 wherein the atomization is performed by injecting the waste water stream into a high velocity gas stream.

3. The process of claim 2 wherein the reaction zone is a fixed bed reactor.

4. The process of claim 2 wherein the reaction zone comprises a fluid bed reactor.

5. The process of claim 2 wherein the waste water stream is atomized with a vapor gas selected from the group consisting of air, ammonia, steam, inert gas and mixtures thereof.

6. The process of claim 1 wherein the reaction zone comprises a fixed bed reactor.

7. The process of claim 1 wherein the reaction zone comprises a fluid bed reactor.

8. The process of claim 1 wherein the atomized waste water is kept at a temperature below 150° C. prior to entry into the reaction zone.

9. The process of claim 1 wherein the atomized waste water is kept at between 50° C. to 100° C. prior to entry into the reaction zone.

10. The process of claim 1 wherein the waste water stream is atomized with a vapor gas selected from the group consisting of air, ammonia, steam, inert gas and mixtures thereof.

* * * * *